(12) United States Patent
Mukaihara et al.

(10) Patent No.: US 7,021,044 B2
(45) Date of Patent: Apr. 4, 2006

(54) SYSTEM FOR DIAGNOSING DETERIORATION OF CATALYST

(75) Inventors: Takashi Mukaihara, Katsuta (JP); Toshio Ishii, Mito (JP); Kiyoshi Miura, Ibaraki-ken (JP); Kazuya Kawano, Katsuta (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/032,102

(22) Filed: Dec. 31, 2001

(65) Prior Publication Data

US 2002/0073693 A1    Jun. 20, 2002

Related U.S. Application Data

(63) Continuation of application No. 09/610,106, filed on Jul. 5, 2000, now Pat. No. 6,343,466, which is a continuation of application No. 08/867,335, filed on Jun. 2, 1997, now abandoned, which is a continuation of application No. 08/663,942, filed on Jun. 14, 1996, now Pat. No. 5,649,420, which is a continuation of application No. 08/233,398, filed on Apr. 26, 1994, now Pat. No. 5,526,643.

(30) Foreign Application Priority Data

Apr. 26, 1993  (JP) .................................. 5-99765

(51) Int. Cl.
    *F01N 3/00* (2006.01)
(52) U.S. Cl. ............................ 60/277; 60/274; 60/276; 60/285; 73/118.1; 701/103
(58) Field of Classification Search .................. 60/274, 60/276, 277, 285, 284; 73/118.1; 701/102, 701/103, 104
See application file for complete search history.

(56) References Cited

U.S. PATENT DOCUMENTS

| 4,007,589 | A |   | 2/1977 | Neidhard et al. |
| 4,656,829 | A | * | 4/1987 | Creps ........................... 60/277 |
| 5,097,700 | A |   | 3/1992 | Nakane |
| 5,158,063 | A | * | 10/1992 | Hosoda ........................ 60/277 |
| 5,177,464 | A | * | 1/1993 | Hamburg .................... 340/439 |
| 5,280,707 | A | * | 1/1994 | Nakashima et al. .......... 60/276 |
| 5,303,580 | A |   | 4/1994 | Schneider et al. |
| 5,311,737 | A | * | 5/1994 | Komatsu et al. .............. 60/276 |
| 5,325,664 | A | * | 7/1994 | Seki et al. .................... 60/276 |
| 5,341,642 | A | * | 8/1994 | Kurihara et al. .............. 60/276 |
| 5,357,754 | A | * | 10/1994 | Ogawa et al. ................ 60/276 |
| 5,381,657 | A | * | 1/1995 | Takizawa et al. ............. 60/276 |
| 5,396,766 | A | * | 3/1995 | Sato et al. .................... 60/276 |

(Continued)

FOREIGN PATENT DOCUMENTS

DE    41 22 787 A1    1/1992

(Continued)

*Primary Examiner*—Binh Q. Tran
(74) *Attorney, Agent, or Firm*—Crowell & Moring LLP

(57) ABSTRACT

A diagnostic system in which the accuracy of the diagnosis of the deterioration state of a catalyst in a catalytic converter for cleaning the exhaust gas of an internal combustion engine is enhanced without incurring a rise in cost. The temperature of the catalyst is estimated using the operating-state signal (for example, the flow rate of intake air or the width of a fuel injection pulse) of the engine by a diagnostic device. The conversion efficiency of the catalyst calculated from the outputs of oxygen sensors is corrected using the estimated temperature by the diagnostic device. The deterioration state of the catalyst is diagnosed on the basis of the corrected temperature by the diagnostic device.

13 Claims, 7 Drawing Sheets

U.S. PATENT DOCUMENTS

| | | | |
|---|---|---|---|
| 5,400,592 A | * | 3/1995 | Mukaihira et al. ............ 60/274 |
| 5,526,643 A | * | 6/1996 | Mukaihira et al. ............ 60/276 |
| 5,649,420 A | * | 7/1997 | Mukaihira et al. ............ 60/274 |
| 6,343,466 B1 | * | 2/2002 | Mukaihira et al. ............ 60/277 |

FOREIGN PATENT DOCUMENTS

| | | |
|---|---|---|
| DE | 41 12 479 A1 | 10/1992 |
| DE | 42 34 420 C1 | 4/1994 |
| JP | 57-2896 | 1/1982 |
| JP | 63-165744 | 7/1988 |
| JP | 3-249320 | 11/1991 |
| JP | 4131762 | 5/1992 |
| JP | 4314953 | 3/1993 |
| JP | 05-098945 | 4/1993 |
| JP | 5-171924 | 7/1993 |

* cited by examiner

SYSTEM FOR DIAGNOSING DETERIORATION OF CATALYST

This application is a continuation of application Ser. No. 09/610,106, filed Jul. 5, 2000 now U.S. Pat. No. 6,343,466, which is a continuation of application Ser. No. 08/867,335, filed Jun. 2, 1997 now abandoned, which is a continuation of application Ser. No. 08/663,942, filed Jun. 14, 1996 now U.S. Pat. No. 5,649,420, which is a file wrapper continuation of Ser. No. 08/233,398, filed Apr. 26, 1994 now U.S. Pat. No. 5,526,643.

BACKGROUND OF THE INVENTION

1. Field of the Invention

The present invention relates to a diagnostic device for a catalytic converter which is employed for treating exhaust gas emitted from an internal combustion engine. More particularly, it relates to a catalyst-deterioration diagnostic system which can diagnose the state of a catalyst by the use of the preset operating-state index of an internal combustion engine and can report the diagnosed result through a display, an alarm sound or the like to the driver of a vehicle having the system installed therein.

2. Description of the Related Art

It has been known that, in making the exhaust gas of an internal combustion engine innoxious through oxidizing and deoxidizing reactions, effectively the reactions are promoted by employing a catalyst which contains a plurality of kinds of catalytic components. In this regard, when the catalyst is used for a long term, it deteriorates into a lower conversion efficiency. Therefore, such a step has heretofore been taken that the conversion efficiency of the catalyst is checked mainly at the time of a routine inspection, and that a catalytic converter including the catalyst is replaced when the regulated value of the conversion efficiency is not met. Accordingly, the conversion efficiency is not especially checked till the routine inspection, and a vehicle in which the catalytic converter is installed runs under the unsatisfactory innoxious condition of the exhaust gas in some cases.

Such circumstances unfavorably lead to environmental pollution. Attempts have therefore been made to check the performance or activity of the catalyst at all times by any method, and to actuate a warning device or a countermeasure device when the catalyst is abnormal. Examples will be stated below.

Japanese Patent Application Publication No. 2896/1982 discloses a technique wherein oxygen-percentage detectors are respectively mounted before and behind a catalytic converter so as to diagnose the state of the catalytic converter on the basis of the detected values of both the detectors. Concretely, the detectors capable of detecting the oxygen concentrations of exhaust gas are respectively disposed upstream and downstream of the catalytic converter. When the oxygen concentration of the exhaust gas detected by either of the detectors has abnormally fallen outside a preset range until the difference thereof from the output of the other detector has exceeded a preset magnitude, a signal is generated to actuate an alarm device or a device for taking steps to rectify the abnormality In addition, according to a technique entitled "Apparatus for Detecting Deterioration of Catalyst" as disclosed in Japanese Patent Application Laid-open No. 249320/1991, the correlation coefficient of the output signals of oxygen sensors mounted before and behind a catalytic converter is calculated so as to diagnose the state of a catalyst with the calculated correlation coefficient.

Further, a method which adopts a sensor for diagnosing the deterioration of a catalyst is disclosed in Japanese Patent Application Laid-open No. 165744/1988. With this method, the catalyst for combustion is so constructed that a catalytic component is carried on a support having a large number of through holes. A basic material in the shape of a rod is inserted into the through hole, and is used as the sensor. The state of the catalyst is diagnosed by measuring the resistance of the rod across both the ends thereof. This method can diagnose the state of the catalyst irrespective of the operating conditions of an engine.

In general, however, the activity of a catalyst varies greatly in dependency on the temperature thereof as illustrated in FIG. 12 of the accompanying drawings, so that the conversion efficiency etc. of the catalyst varies in accordance with the temperature thereof. It is accordingly necessary for the precise diagnosis of the deterioration state of the catalyst to stipulate the temperature of the catalyst on the occasion of the diagnosis or to correct a calculated conversion efficiency in accordance with the temperature of the catalyst at the time of the diagnosis. To this end, however, a temperature sensor for monitoring the temperature of the catalyst is required, resulting in the problem of rise in cost.

SUMMARY OF THE INVENTION

The present invention has for its object to provide a catalyst-deterioration diagnostic system which can precisely diagnose the state of a catalyst in correspondence with the temperature thereof, without incurring a rise in cost.

In the first aspect of performance of the present invention, there is provided a temperature estimation apparatus, comprising state detection means for detecting a value of a state variable which correlates with a temperature of a part to have its temperature detected; memory means for prestoring therein correspondence information which indicate corresponding relations between detected results of the state detection means and temperatures of the part for the temperature detection; and estimation means for estimating the temperature of the part for the temperature detection by referring to the correspondence information on the basis of the detected result of the state detection means.

In this case, it is preferable that the part for the temperature detection is a catalyst which cleans exhaust gas of an engine; and that the state variable includes at least one member which is selected from the group consisting of a quantity of intake air, a quantity of fuel injection and r.p.m. (revolutions per minute) of the engine.

In the second aspect of performance of the present invention, there is provided a method of estimating a temperature of a catalyst, comprising the steps of prestoring corresponding relations between temperatures of the catalyst which cleans exhaust gas of an engine and values of a state variable which correlates with the temperatures of the catalyst; and detecting an actual value of the state variable, and then comparing the detected value with the stored corresponding relations, thereby estimating the temperature of the catalyst.

In the third aspect of performance of the present invention, there is provided a catalyst-deterioration diagnostic system for diagnosing a deterioration state of a catalyst, comprising index means for obtaining a value of an index (for example, a conversion efficiency of the catalyst) which is used for deciding the deterioration state of the catalyst; catalyst state estimation means for estimating a state of the catalyst at a time at which the index means has obtained the index value, as to a physical quantity which affects a catalytic action of the catalyst; correction means for correcting the index value obtained by the index means, to a value in a standard state of the catalyst previously set as to the physical quantity, by the use of the estimated result of the catalyst state estimation means; and decision means endowed with a preset criterion value, and for deciding the deterioration state of the catalyst by comparing the index value corrected by the correction means, with the criterion value.

In the fourth aspect of performance of the present invention, there is provided a catalyst-deterioration diagnostic system for diagnosing a deterioration state of a catalyst, comprising index means for obtaining a value of an index (for example, a conversion efficiency of the catalyst) which is used for deciding the deterioration state of the catalyst; decision means endowed with a preset criterion value, and for deciding the deterioration state of the catalyst by comparing the index value obtained by the index means, with the criterion value; catalyst state estimation means for estimating a state of the catalyst at a time at which the index means has obtained the index value, as to a physical quantity which affects a catalytic action of the catalyst; and suspension means endowed with a predetermined range concerning the physical quantity, and for causing the decision means to suspend the decision on condition that a value of the physical quantity obtained by the catalyst state estimation means is outside the predetermined range.

In each of the third and fourth aspects of performance, the catalyst-deterioration diagnostic system may well be so constructed that the catalyst serves to eliminate noxious substances which are contained in exhaust gas of an engine, and that the catalyst state estimation means includes operating-situation detection means for detecting a value of a state variable of the engine as correlates with the physical quantity, memory means for storing therein correspondence information which indicate correlations between values of the state variable and those of the physical quantity, and arithmetic means for determining a value of the physical quantity by referring to the correspondence information on the basis of the detected result of the operating-situation detection means.

In the fifth aspect of performance of the present invention, a catalyst-deterioration diagnostic system for diagnosing a deterioration state of a catalyst, wherein the catalyst serves to eliminate noxious components which are contained in exhaust gas of an engine, comprises: index means for obtaining a value of an index which is used for deciding the deterioration state of the catalyst; operating-situation detection means for detecting a value of that state variable of the engine which correlates with a physical quantity affecting a catalytic action of the catalyst; correction means for correcting the index value obtained by the index means, to a value in a standard state of the catalyst previously set as to the physical quantity, by the use of the detected result of the operating-situation detection means; and decision means endowed with a preset criterion value, and for deciding the deterioration state of the catalyst by comparing the index value corrected by the correction means, with the criterion value.

In the sixth aspect of performance of the present invention, a catalyst-deterioration diagnostic system for diagnosing a deterioration state of a catalyst, wherein the catalyst serves to eliminate noxious components which are contained in exhaust gas of an engine, comprises: index means for obtaining a value of an index which is used for deciding the deterioration state of the catalyst; decision means endowed with a preset criterion value, and for deciding the deterioration state of the catalyst by comparing the index value obtained by the index means, with the criterion value; operating-situation detection means for detecting a value of that state variable of the engine which correlates with a physical quantity affecting a catalytic action of the catalyst; and suspension means endowed with a predetermined range concerning the state variable, and for causing the decision means to suspend the decision on condition that the value of the state variable detected by the operating-situation detection means is outside the predetermined range.

In each of the fourth and sixth aspects of performance, it is preferable that the catalyst-deterioration diagnostic system further comprises alarm means for giving an alarm for the suspension of the decision when the decision has been suspended by the suspension means.

In the seventh aspect of performance of the present invention, a catalyst-deterioration diagnostic system for diagnosing a deterioration state of a catalyst, wherein the catalyst serves to eliminate noxious components which are contained in exhaust gas of an engine, comprises: index means for obtaining a value of an index which reflects the deterioration state of the catalyst; operating-situation detection means for detecting a value of that state variable of the engine which correlates with a physical quantity affecting a catalytic action of the catalyst; correction means for correcting the value detected by the operating-situation detection means, to a value in a standard state of the catalyst previously set as to the index, by the use of the index value obtained by the index means; and decision means endowed with a preset criterion value, and for deciding the deterioration state of the catalyst by comparing the value corrected by the correction means, with the criterion value.

In each of the aspects of performance mentioned above, it is allowed that the physical quantity is a temperature of the catalyst; and that the state variable includes at least one member which is selected from the group consisting of a quantity of intake air, a quantity of fuel injection and r.p.m. (revolutions per minute) of the engine.

According to the present invention thus far summarized, the temperature of the catalyst can be known without using a thermometer. Moreover, since the deterioration state of the catalyst is decided after the correction of the calculated conversion efficiency, it is diagnosed precisely.

DESCRIPTION OF THE PREFERRED EMBODIMENT

An embodiment of the present invention will be described in conjunction with the accompanying drawings.

Figure 1:
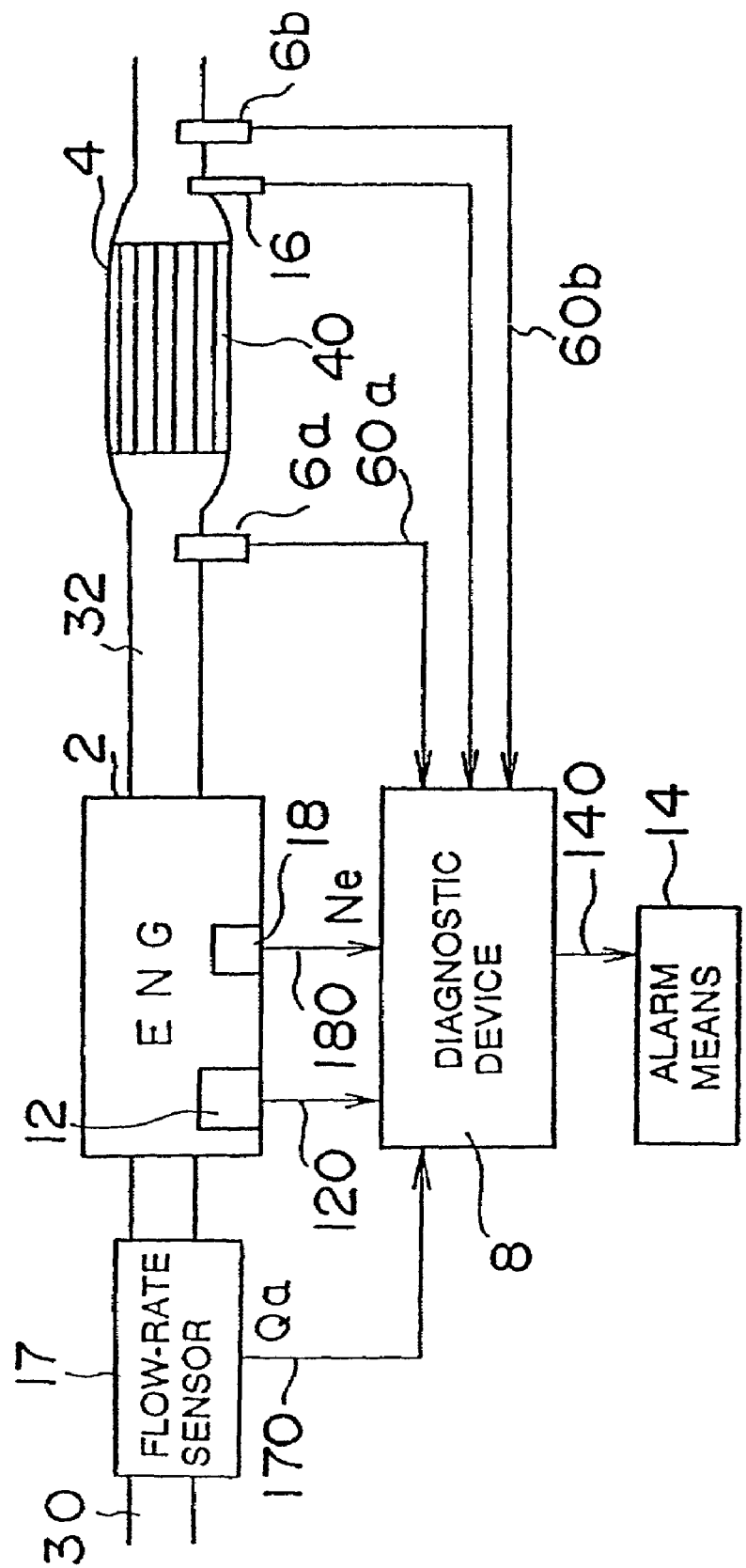
FIG. 1 is a schematic diagram showing an embodiment of the present invention.

First of all, an engine system to which a catalyst diagnostic system in this embodiment is applied will be outlined with reference to FIG. 1. It is to be understood, however, that the object of the application of the present invention is not restricted to the exemplified engine system.

Connected to the engine 2 of the engine system are an intake pipe 30 for introducing air, and an exhaust pipe 32 for emitting a gas after combustion, as exhaust gas. A catalytic converter 4 is incorporated midway of the exhaust pipe 32. The catalytic converter 4 receives therein a catalyst 40 which serves to eliminate noxious substances, such as unburnt hydrocarbons (HC) and nitrogen oxides ($NO_x$), contained in the exhaust gas. A ternary catalyst is often used as the catalyst 40, but the present invention is not restricted thereto. A temperature sensor 16 is disposed on the exit side of the catalyst 40. In addition, the engine 2 is furnished with a fuel injector 12 which serves to inject fuel into the air introduced through the intake pipe 30, thereby preparing mixture.

Further, in order to control the engine system, the constituents mentioned above are respectively furnished with sensors for detecting the states thereof. By way of example, the intake pipe 30 is furnished with a flow-rate sensor 17 for detecting the quantity of intake air, and the engine 2 with an r.p.m. (revolutions per minute) sensor 18 for detecting the revolution speed or number thereof.

The air introduced through the intake pipe 30 and the fuel injected by the fuel injector 12 are turned into the mixture, which is burnt in the cylinder of the engine 2. Thereafter, the gas after the combustion is emitted as the exhaust gas through the exhaust pipe 32. The unburnt hydrocarbons (HC), nitrogen oxides ($NO_x$), etc. contained in the exhaust gas are treated by the catalyst 40 received in the catalytic converter 4.

The catalyst diagnostic system in this embodiment will be described.

As already stated in the section of the related art, the conversion efficiency of a catalyst varies depending upon the temperature thereof, so that it needs to be calculated subject to the previous stipulation of the temperature state of the catalyst. Meanwhile, the temperature of the catalyst 40 during the operation of the engine 2 varies basically in accordance with the quantity of heat which the catalyst 40 receives from the exhaust gas. This embodiment features that, with note taken of the above aspect of the temperature variation of the catalyst 40, the output signals of the several sensors (the flow-rate sensor 17, the r.p.m. sensor 18, etc.) and the width $T_P$ of the fuel injection pulse of the fuel injector 12 as indicate the operating situation of the engine 2 are monitored as state variables, whereupon a predetermined calculation is executed with at least one of the state variables, thereby estimating the temperature state of the catalyst 40 though approximately. Also, this embodiment features that the diagnosis of the deterioration of the catalyst is corrected or suspended in accordance with the estimated result.

By the way, in this specification, the expression "conversion efficiency" shall be defined by Equation (1) given below. Besides, an expression "degree of deterioration" shall be defined by Equation (2) given below.

$$\frac{\text{Conversion}}{\text{efficiency}} = 1 - \frac{\text{Quantity of Noxious substances After Treatment by Catalyst}}{\text{Quantity of Noxious substances Before Treatment by Catalyst}} \quad (1)$$

$$\frac{\text{Degree of}}{\text{Deterioration}} = \frac{1}{\text{Conversion efficiency}} \quad (2)$$

Now, the construction and operation of this embodiment will be described concretely.

The catalyst diagnostic system is mainly constructed of a diagnostic device 8, sensors for detecting the operating situation of the engine 2, and oxygen sensors 6a, 6b (refer to FIG. 1)

The oxygen sensors 6a and 6b function to detect the oxygen concentrations of the exhaust gas, and are made of zirconia ($ZrO_2$) in this embodiment. It is to be understood, however, that the material of the oxygen sensors 6a and 6b are not restricted to the adopted one. The oxygen sensor 6a is mounted in correspondence with the entrance part of the catalytic converter 4 in order to detect the oxygen concentration of the exhaust gas before being treated by the catalyst 40. On the other hand, the oxygen sensor 6b is mounted in correspondence with the exit part of the catalytic converter 4 in order to detect the oxygen concentration of the exhaust gas after having been treated by the catalyst 40.

The sensors for detecting the operating situation of the engine 2 include a sensor for detecting the quantity of intake air, a sensor for detecting the r.p.m. (revolutions per minute) of the engine 2, and so forth. Since, however, the flow-rate sensor 17, r.p.m. sensor 18, etc. stated before can be utilized as the sensors of the diagnostic system without any change, these sensors for the diagnostic use need not be disposed anew (naturally, they need to be disposed anew in a case where the engine 2, etc. are not furnished with the sensors 17, 18, etc.).

Figure 2:
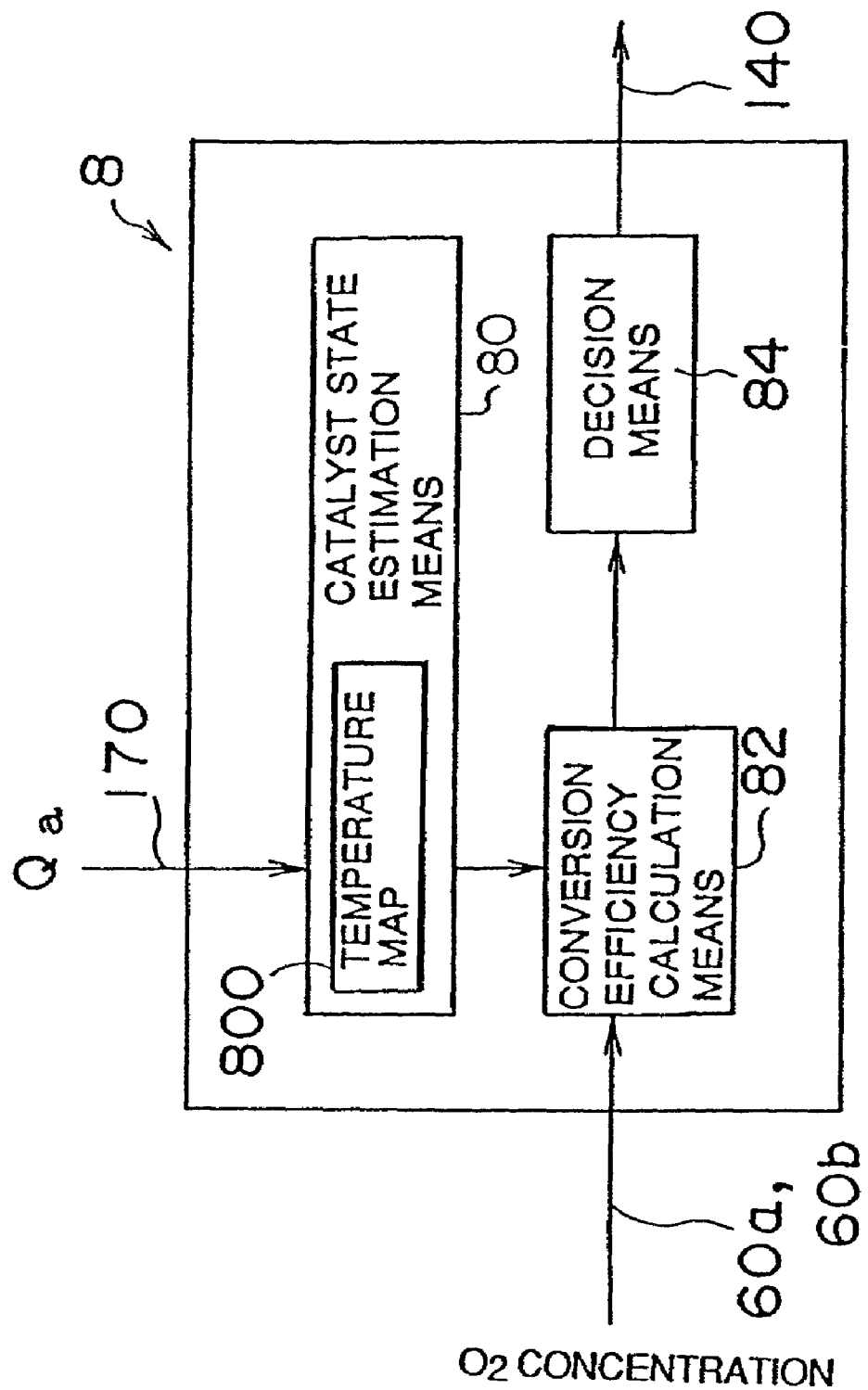
FIG. 2 is a block diagram showing the internal construction of a diagnostic device.

As illustrated in FIG. 2, the diagnostic device 8 includes therein catalyst state estimation means 80, conversion efficiency calculation means 82 and decision means 84. The catalyst state estimation means 80 is furnished with a temperature map 800.

The catalyst state estimation means 80 executes a predetermined calculation with the output signal 170 (indicative of the quantity $Q_a$ of intake air) of the flow-rate sensor 17, thereby estimating the temperature state of the catalyst 40. In this embodiment, the estimation is based on the output signal 170 of the flow-rate sensor 17. As an alternative contrivance, however, the temperature state of the catalyst 40 can be estimated even with any of the width $T_P$ of the fuel injection pulse of the fuel injector 12, namely, the output signal 120 of the fuel injector 12 as shown in FIG. 1 (in general, a fuel injector adjusts the quantity of fuel injection by adjusting the width of a fuel injection pulse), the output signal 180 (indicative of the revolution speed Ne of the engine 2) of the r.p.m. sensor 18, the velocity of an automobile in which the engine system is installed, and so forth.

Incidentally, an expedient for estimating the catalyst temperature will be explained in detail later.

The conversion efficiency calculation means 82 calculates the conversion efficiency at which the catalyst 40 converts the noxious substances into innoxious substances. The calculation of the conversion efficiency is effected using the output signals 60*a*, 60*b* of the respective oxygen sensors 6*a*, 6*b*. Since a method for the calculation is not, in itself, essential to this embodiment and is a technique having already been known, it shall not be especially explained here. Applicable as the calculation method is, for example, one disclosed in Japanese Patent Application No. 338220/1991. However, the calculation method for computing the conversion efficiency in the present invention is not restricted to this example, but the conversion efficiency may well be calculated by any other method.

In addition to the function of calculating the conversion efficiency by the use of the actual measurement data of the oxygen concentrations, the conversion efficiency calculation means 82 has the function of correcting the calculated value of the conversion efficiency in accordance with the temperature of the catalyst 40 on each occasion. This Conversion efficiency calculation means 82 is endowed with temperatures ($T_{X1}$ and $T_{X2}$ to be mentioned later) which serve as criteria concerning whether or not the calculated value of the conversion efficiency is to be corrected and whether or not the state of the catalyst is to be diagnosed. A method for the correction will be explained in detail later.

The decision means 84 is previously endowed with a standard limit value $C_{ST}$ indicating that limit of the deterioration at which the catalyst 40 (catalytic converter 4) must be replaced. Thus, it compares the calculated result (=the conversion efficiency or the corrected value thereof) of the conversion efficiency calculation means 82 with the standard limit value $C_{ST}$, thereby deciding the deterioration state of the catalyst 40. In a case where the necessity of the replacement of the catalyst 40 has been diagnosed as the result of the decision, the decision means 84 functions to actuate alarm means 14 and to give warning to the driver of the automobile as will be explained later. Besides, in a case where the conversion efficiency calculation means 82 produces a result indicative of the impossibility of the diagnosis, for example, where the temperature estimated by the catalyst state estimation means 80 is lower than the preset one, the decision means 84 does not render the decision.

By the way, the above expression "that limit of the deterioration at which the catalyst 40 must be replaced" does not signify that lower limit of the conversion efficiency which is indiscriminately set, but it signifies "that limit of the deterioration at which the exhaust gas can be cleaned up to, at least, a state capable of satisfying the p.p.m. (parts per million) regulations thereof stipulated legally". That is, the limit of the deterioration is set for each individual engine system in relation to the capacity of the catalytic converter 4. In the case of the engine system which is furnished with the catalytic converter 4 of very large capacity beforehand, accordingly, the catalyst 40 is not always decided as requiring replacement even when the conversion efficiency has lowered drastically (for example, even when the conversion efficiency has become 10 [%]). To the contrary, in the case of the engine system which employs the catalytic converter 4 having almost no margin in capacity, the catalyst 40 can be decided as requiring replacement even when the conversion efficiency has lowered only by a slight amount (for example, even when the conversion efficiency has become 90 [%]). However, the decision of the catalyst state is not restricted to the above method, but it may well be rendered in relation to the value of the conversion efficiency set indiscriminately. Needless to say, however, the p.p.m. regulations of the exhaust gas need to be met even in this case. Such a requisite comes from the viewpoints of observing laws and preserving the environment, and does not come from the technical viewpoint of the present invention.

Since the conversion efficiency of the catalyst 40 varies depending upon the temperature thereof, naturally the comparison of the conversion efficiency with the standard limit value $C_{ST}$ needs to be made at a certain temperature specified as a criterion (hereinbelow, termed the "standard decision temperature $T_S$") on which the setting of the standard limit value $C_{ST}$ is premised. Accordingly, a correction coefficient $K_{XX}$ to be stated later is set assuming that the conversion efficiency after the correction becomes a value at the standard decision temperature $T_S$. The decision means 84 may well possess the standard decision temperature $T_S$ along with the standard limit value $C_{ST}$.

The diagnostic device 8 in practical use is configured of an arithmetic circuit such as a microcomputer, and a memory in which programs are held stored. Various information items necessary for the diagnosis, which contain the temperature map 800 and values $C_{ST}$, $T_S$, $T_{X1}$, and $T_{X2}$ stated above and correction coefficients to be stated later, are stored in the memory of the diagnostic device 8 beforehand.

The alarm means 14 reports the necessity of the replacement of the catalyst 40 to the driver of the automobile by, e.g., sounding an alarm or lighting up a warning lamp in accordance with a signal 140 which is delivered from the diagnostic device 8 when the catalyst replacement is required.

An expression "standard state" in claim 4 of the appended claims corresponds to the state of the standard decision temperature $T_S$ in this embodiment, and an expression "criterion value" to the standard limit value $C_{ST}$. An expression "predetermined range concerning the physical quantity" in claim 5 corresponds to a temperature range which is not lower than the temperature $T_{X1}$ (or $T_{X2}$). "Index means", "correction means" and "suspension means" mentioned in claims 4 and 5 are implemented by the conversion efficiency calculation means 82 in this embodiment. "Operating-situation detection means" mentioned in claim 6 includes the flow-rate sensor 17, etc. An expression "correspondence information" signifies the temperature map 800. "Arithmetic means" and "memory means" correspond to the microcomputer and the memory which constitute the diagnostic device 8, respectively.

Now, the operation of this embodiment will be described. First of all, the calculation of the catalyst state estimation means 80 for the estimation of the temperature state of the catalyst 40 will be explained in detail.

Figure 3:
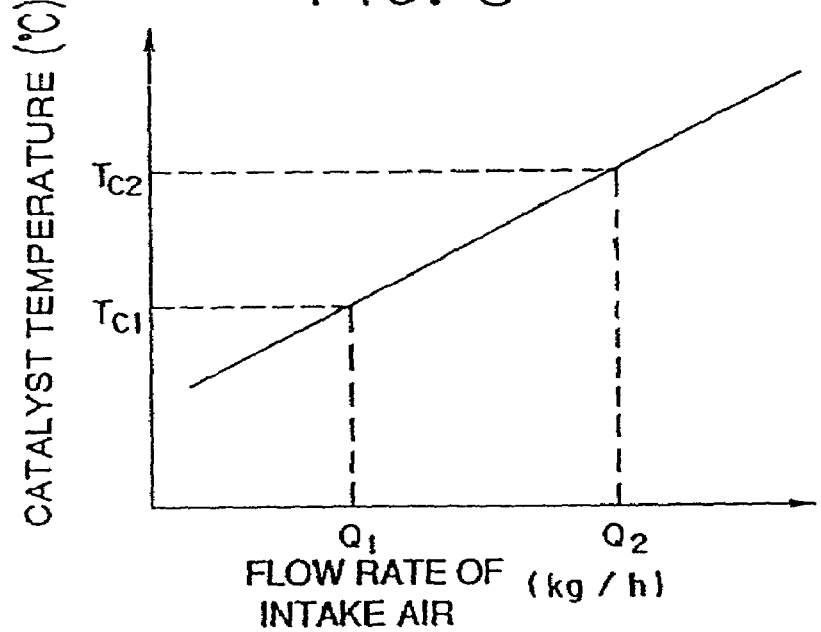
FIG. 3 is a graph showing the general relationship between the flow rate of intake air and the temperature of a catalyst.

The relationship between the flow rate of intake air and the temperature of a catalyst is generally such that, as illustrated in FIG. 3, the catalyst temperature rises with increase in the flow rate of intake air. This is based on the fact that the temperature of the catalyst varies depending upon the temperature, flow rate etc. of exhaust gas (that is, the quantity of combustion or the quantity of generated heat within an engine), and that the quantity of combustion, etc., in turn, correspond to the flow rate of intake air.

The catalyst state estimation means 80 is endowed beforehand with the temperature map 800 which indicates the relationship between the average value of air flow rates within a predetermined time period and the temperature of the catalyst 40.

Using the output values 170 of the flow-rate sensor 17, the catalyst state estimation means 80 calculates the average value of air flow rates within a predetermined time period in the past (needless to say, this predetermined time period is equal in length to the time period determined for the calculation of the average value of air flow rates in the preparation of the temperature map 800). Subsequently, the estimation means 80 refers to the temperature map 800 and estimates a temperature held in correspondence with the calculated average value, as the temperature of the catalyst 40 at that time.

Herein, the length of the time period for calculating the average value is determined for each individual engine system in relation to the thermal capacity and specific heat of the catalyst 40, the quantity of the exhaust gas emitted from the engine, and so forth. The reason therefor is that the temperature of the catalyst 40 is determined by the quantity of heat accumulated in the catalyst 40, and that the quantity of the accumulated heat is, in turn, determined by the magnitudes of the quantities of heat flowing into and out of the catalyst 40, the difference and ratio between the outflow and inflow, and so forth.

Figure 4:
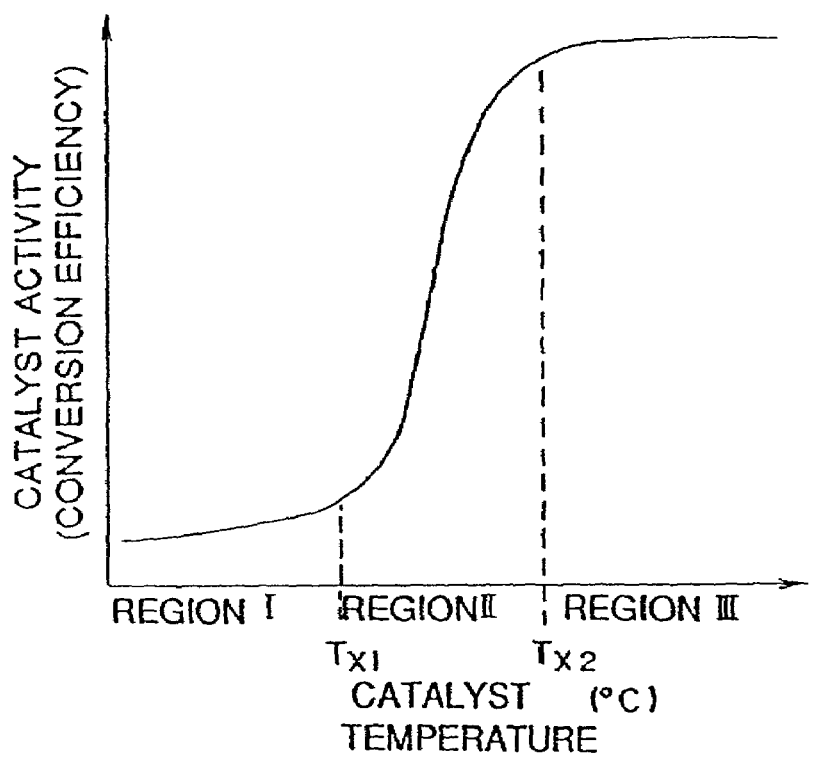
FIG. 4 is a graph showing the relationship between the temperature of a catalyst and the conversion efficiency thereof.

Next, there will be explained that correction of the conversion efficiency which the conversion efficiency calculation means 82 executes using the estimated temperature of the catalyst state estimation means 80. As illustrated in FIG. 4, the aspect of the variation of the activity of the catalyst 40 differs greatly, depending upon the temperature regions of this catalyst. In the region above the temperature $T_{X2}$, the catalyst 40 demonstrates its activity sufficiently, and the magnitude of the activity is substantially constant irrespective of temperature values. In contrast, in the region below the temperature $T_{X1}$, the catalyst 40 is hardly active at all. Besides, in the region between the temperatures $T_{X1}$ and $T_{X2}$, the catalyst activity varies greatly in correspondence with temperature values.

Accordingly, the conversion efficiency calculation means 82 executes different processes in accordance with which of the three regions the temperature of the catalyst 40 lies in. Although the concrete values of the temperatures $T_{X1}$ and $T_{X2}$ differ depending upon the kind of the catalyst 40, they are about 350 [° C.] and about 450 [° C.], respectively, in many kinds of catalysts. Incidentally, the values of the temperatures $T_{X1}$ and $T_{X2}$ are bestowed on the conversion efficiency calculation means 82 beforehand.

In the region III whose temperature is higher than the value $T_{X2}$, the calculation means 82 delivers the conversion efficiency obtained with actual measurement data on each occasion, to the decision means 84 without any change. Since, as stated before, the method of calculating the conversion efficiency does not form the feature of the present invention, it shall not be explained in detail here.

In the region I whose temperature is lower than the value $T_{X1}$, the catalyst activity is hardly noticeable, and it is inappropriate to diagnose the conversion efficiency and the degree of deterioration by the use of data measured under such a state. In this case, therefore, the calculation means 82 deems the diagnosis (or the correction) to be impossible and supplies the decision means 84 with an output indicating to that effect.

When the temperature of the catalyst 40 lies in the region II which extends between the temperatures $T_{X1}$ and $T_{X2}$, the conversion efficiency calculation means 82 corrects the conversion efficiency calculated on the basis of actual measurement data, to a value at the standard decision temperature $T_S$ on which the setting of the standard limit value $C_{ST}$ (possessed by the decision means 84) is premised. Thereafter, it delivers the corrected value to the decision means 84.

Figure 5:
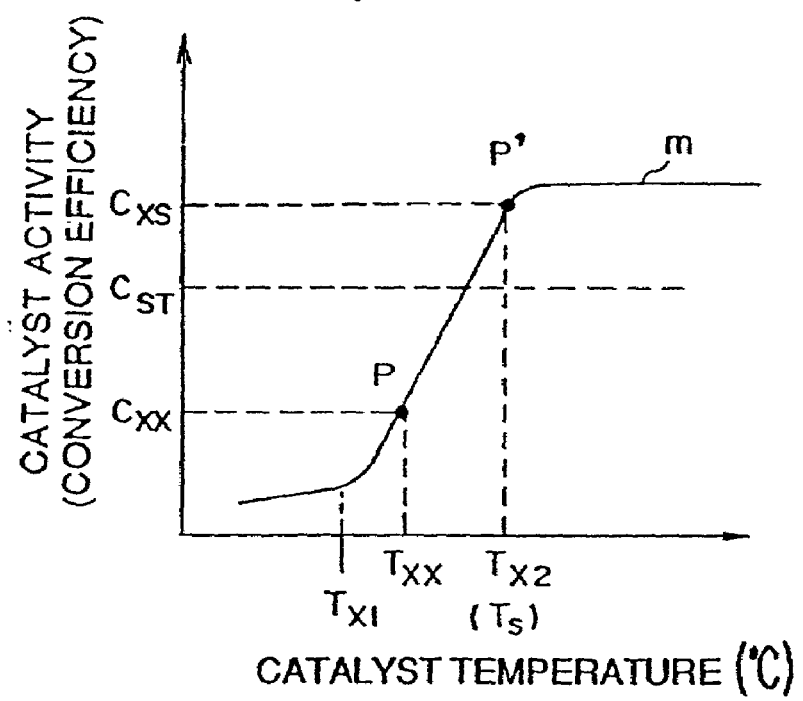
FIG. 5 is a graph showing the concept of a correction for the conversion efficiency.

The correction is done by multiplying the calculated conversion efficiency by the correction coefficient. By way of example, let's consider a case illustrated in FIG. 5 where the temperature estimated by the catalyst state estimation means 80 is $T_{XX}$ and where the conversion efficiency calculated on the basis of the actual measurement data by the conversion efficiency calculation means 82 is $C_{XX}$ (in other words, a case which corresponds to the position of a point P shown in FIG. 5). In this case, a value $C_{XS}$ obtained by multiplying the conversion efficiency $C_{XX}$ by the correction coefficient $K_{XX}$ at the temperature $T_{XX}$ as indicated by Equation (3) below is delivered to the decision means 84 as the conversion efficiency at the standard decision temperature $T_S$ (corresponding to a point P'). Incidentally, although a curve m indicating the variation of the conversion efficiency of the catalyst 40 is depicted in FIG. 5, the depiction is merely intended to facilitate understanding, and the diagnostic device 8 does not have the data of the whole curve m.

$$C_{XS}=C_{XX}K_{XX} \quad (3)$$

Figure 6:
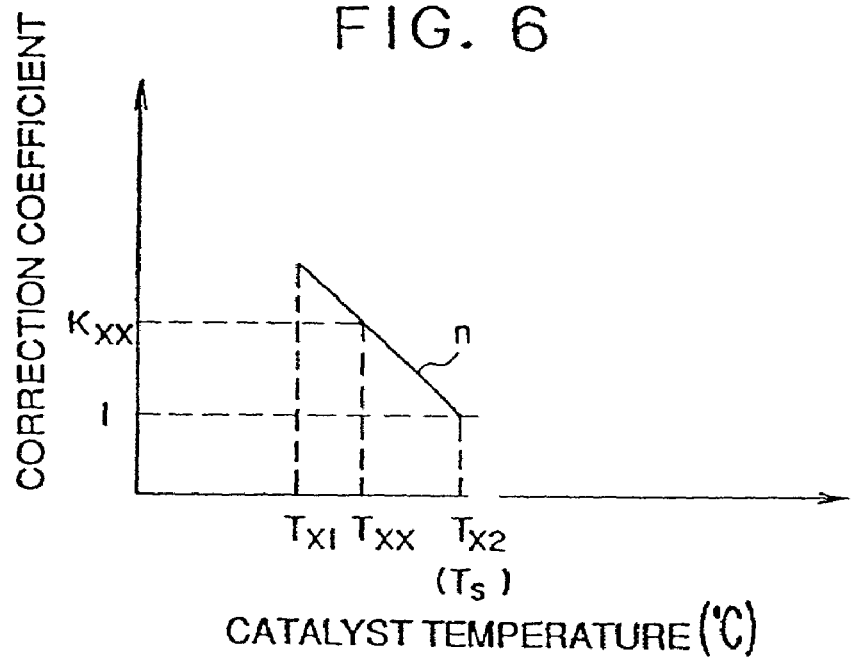
FIG. 6 is a graph showing an example of a correction coefficient which is used for the correction of the conversion efficiency.

The correction coefficient $K_{XX}$ is set on the basis of empirical data, assuming that the conversion efficiency $C_{XS}$ after the correction becomes the value at the standard decision temperature $T_S$. The correction coefficient $K_{XX}$ is bestowed on the conversion efficiency calculation means 82 beforehand (refer to FIG. 6) Originally, precise corrections cannot be made unless the gradient etc. of a segment n indicative of the correction coefficient $K_{XX}$ is altered in accordance with the deterioration state of the catalyst 40. However, few problems arise in practical use when the correction coefficient is set on the premise of the deterioration of the catalyst intermediate between the normal state of the catalyst having undergone no deterioration and the deterioration state of the catalyst requiring the replacement thereof. Although the correction coefficient $K_{XX}$ is rectilinearly depicted in FIG. 6, it is needless to say that the present invention is not restricted to such a rectilinear correction coefficient. As stated above, the optimum correction coefficient is set on the basis of the empirical data.

In this embodiment, the standard decision temperature $T_S$ is equalized to the temperature $T_{X2}$ in order that the decision means 84 may be permitted to render the decisions by the use of the identical standard limit value $C_{ST}$ in the regions III and II.

Figure 7:
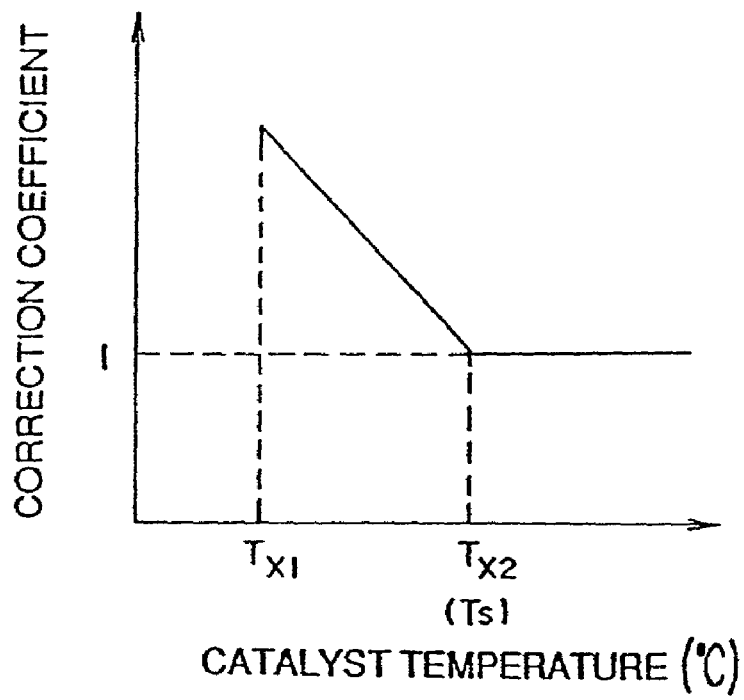
FIG. 7 is a graph showing another example of the correction coefficient.
Figure 8:
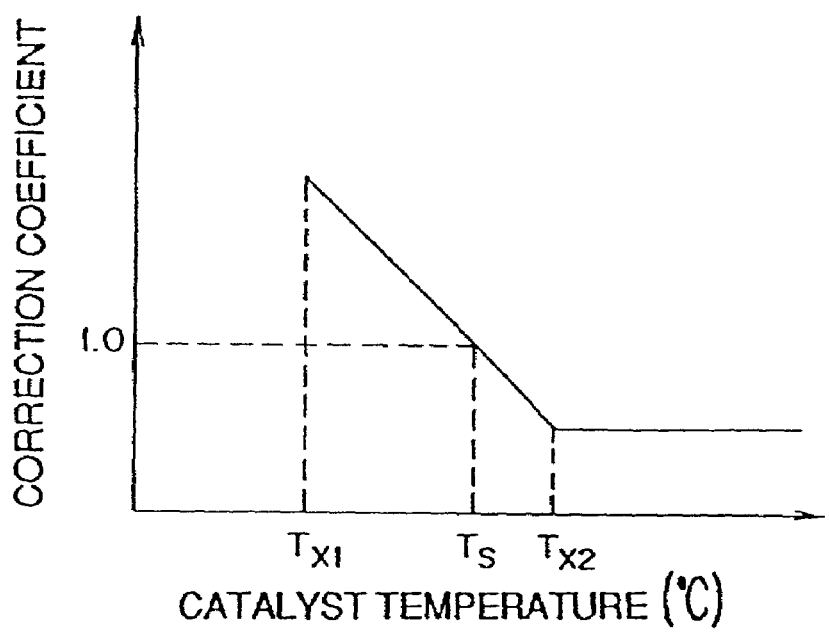
FIG. 8 is a graph showing still another example of the correction coefficient.

In the region III, the conversion efficiency calculated on the basis of only the actual measurement data is directly output without being corrected. This aspect can also be considered as the state in which the correction coefficient is 1 (unity). Accordingly, when the correction coefficient is defined as illustrated in FIG. 7, the regions II and III can be handled without any discrimination. Further, in the case where the conversion efficiency is corrected also in the region III in this manner, only one standard limit value $C_{ST}$ may well be set without bringing the standard decision temperature $T_S$ and the temperature $T_{X2}$ into agreement. The reason therefor is that, with some ways of setting the correction coefficient, the conversion efficiency calculated in the region III can also be corrected down to the standard decision temperature $T_S$. In this case, the correction coefficient becomes smaller than 1 (unity) in the region III (refer to FIG. 8).

The method of the correction is not restricted to the above one, but the correction of the conversion efficiency may well be executed using, for example, an approximate formula which is empirically obtained.

Further, the execution of the correction of the conversion efficiency may well be substituted by a contrivance in which the relationship between the temperature in the region II and the conversion efficiency (in the state in which the catalyst 40 has undergone no deterioration) is held in the form of a map, and in which the conversion efficiency at the temperature estimated by the catalyst state estimation means 80 is read by referring to the map. In this case, the decision means 84 compares the conversion efficiency at the estimated temperature read from the map, with the conversion efficiency at the estimated temperature calculated on the basis of the actual measurement data by the conversion efficiency calculation means 82. This contrivance brings forth the advantages that a higher processing speed can be attained, and that a more precise decision can be rendered. The map is bestowed on the decision means 84. The conversion efficiency calculation means 82 needs only to calculate the conversion efficiency at the temperature estimated by the catalyst state estimation means 80 and to deliver the calculated value to the decision means 84. The map may well be bestowed on the conversion efficiency calculation means 82. In this case, the calculation means 82 supplies the decision means 84 with both the value read from the map and the value calculated from the actual measurement data.

Alternatively, the correction of the conversion efficiency thus far explained can be dispensed with in such a way that the decision by the decision means 84 is rendered in only the region III and is suspended in the regions I and II. As in the process concerning the region I, the conversion efficiency calculation means 82 determines whether or not the decision is to be suspended, and it supplies the decision means 84 with an output indicating to that effect.

In this embodiment, the temperature of the catalyst 40 is estimated using the value of the flow rate of intake air (Qa indicated by the output signal 170 of the flow-rate sensor 17). As stated before, however, the catalyst temperature can be similarly estimated with the average value of the quantity of fuel injection within a predetermined time period in the past (this average value can be readily known from, for example, a computation utilizing the width $T_P$ of a fuel injection pulse as indicated by the output signal 120 of the fuel injector 12) or the average value of the revolution speed (r.p.m.) Ne of the engine 2 within a predetermined time period in the past (this average value can be readily known from the output signal 180 of the r.p.m. sensor 18). Further, the estimation of the catalyst temperature is permitted by comprehensively considering the velocity of the automobile and the stage of a reduction gear.

Figure 9:
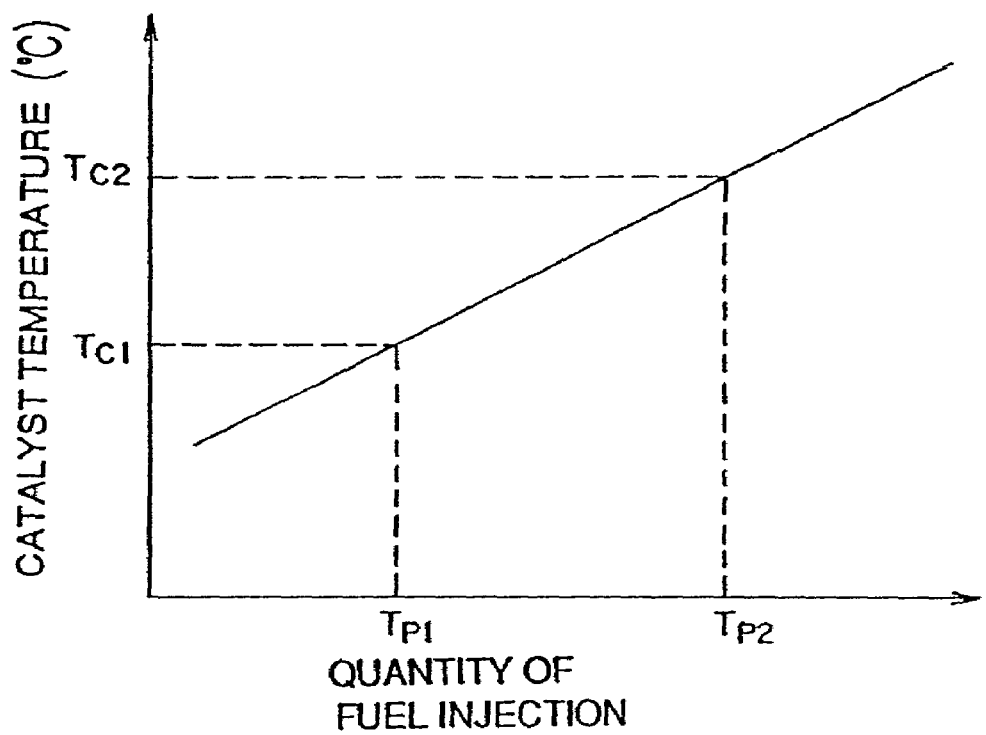
FIG. 9 is a graph showing the general relationship between the quantity of fuel injection and the temperature of the catalyst.
Figure 10:
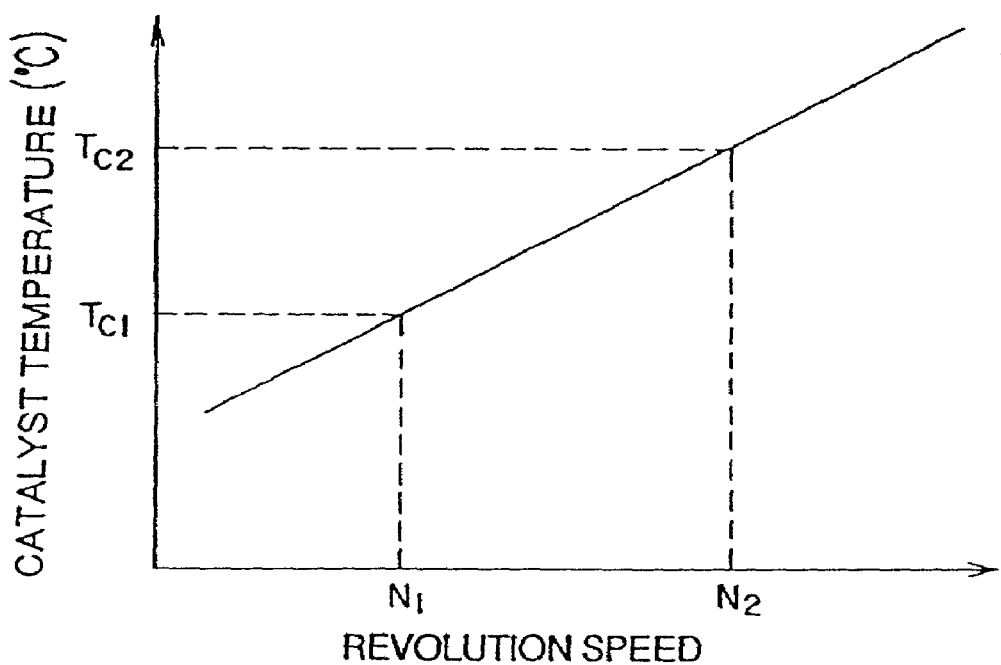
FIG. 10 is a graph showing the general relationship between the revolution speed of an engine and the temperature of the catalyst.

As illustrated in FIG. 9 by way of example, the relationship between the quantity of fuel injection and the catalyst temperature is such that the temperature of the catalyst 40 becomes higher as the quantity of fuel injection within a predetermined time period is larger. As similarly illustrated in FIG. 10, the relationship between the revolution speed (r.p.m.) of the engine 2 and the catalyst temperature is such that the temperature of the catalyst 40 becomes higher as the revolution speed is higher. Such tendencies are observed for the reason that, likewise to the flow rate of intake air, the quantity of fuel injection and the revolution speed have somewhat corresponding relations with the quantity of combustion proceeding in the combustion chamber of the engine 2. Needless to say, FIGS. 9 and 10 correspond to FIG. 3 in the foregoing embodiment, and similar techniques are applicable concerning the estimation of the catalyst temperature, the correction of the conversion efficiency, and so forth.

It has been explained above that the temperature is estimated using the average value within the predetermined time period in the past. In principle, however, it is the same as the above contrivance to evaluate the total quantity of intake air (the total quantity of fuel injection, or the total number of revolutions) within the predetermined time period in the past, and to estimate the temperature of the catalyst 40 by the use of the value of the total quantity of intake air (or the like) as it is. In this case, an arithmetic operation for calculating the average value is dispensed with, so that a higher processing speed is attained.

Besides, in a case where the operating situation of the engine 2 is very steady, or in the engine system wherein the catalyst temperature reaches the region III mostly in the state in which the engine 2 is in operation, neither of the process of the calculation of the average value and the measurement of the time period as in the foregoing contrivances is required. Herein, it suffices to merely integrate the quantity of intake air and then diagnose the state of the catalyst 40 when the integral value has reached a prescribed value.

Figure 11:
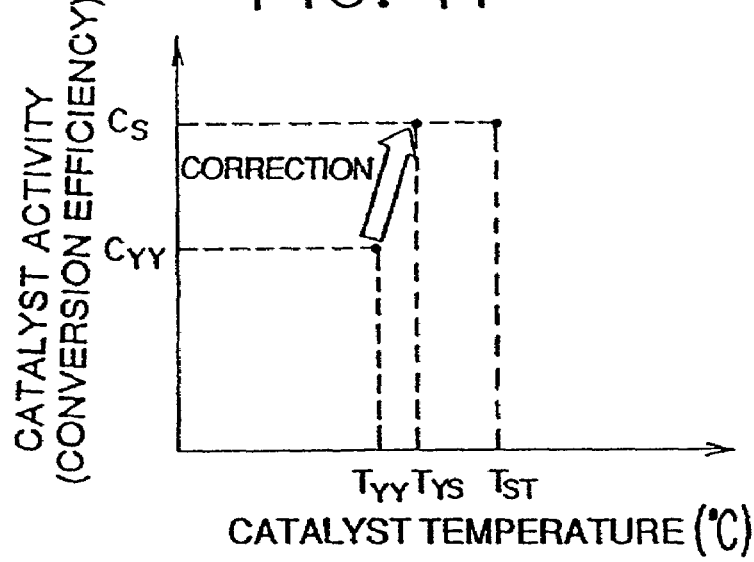
FIG. 11 is a graph showing an example in which the deterioration state of the catalyst is decided on the basis of the value of the catalyst temperature.
Figure 12:
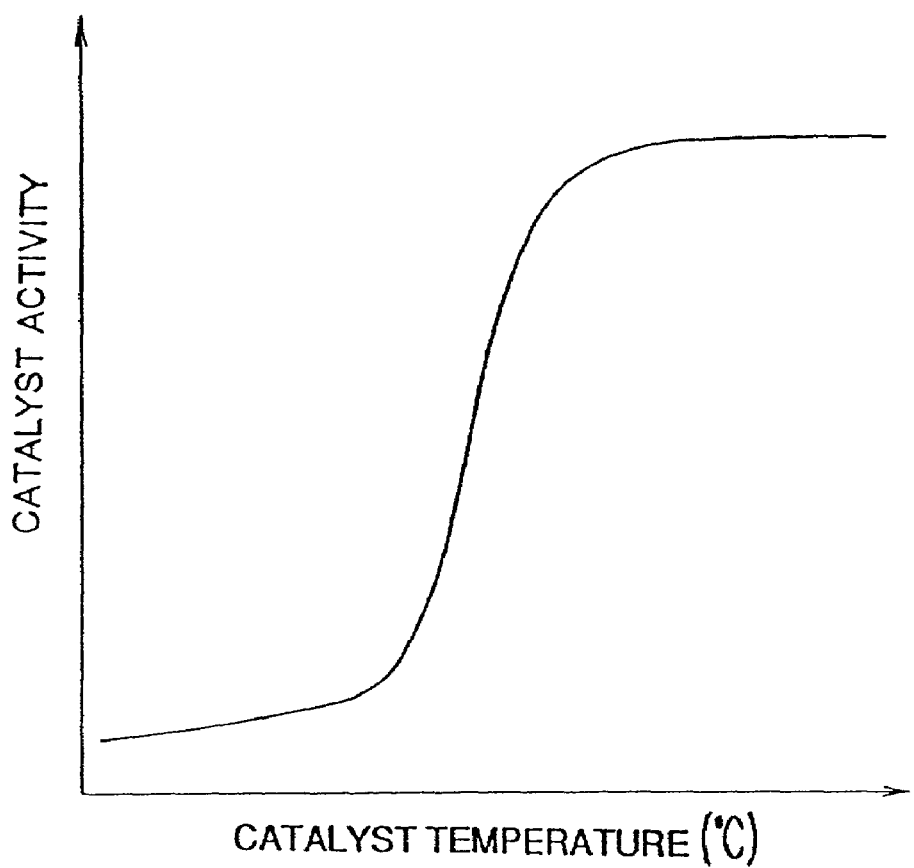
FIG. 12 is a graph showing the temperature characteristics of the activity of the catalyst.

In the embodiment described above, whether or not the replacement of the catalyst 40 is necessary is decided by judging the magnitude of the conversion efficiency. To the contrary, however, the necessity of the replacement of the catalyst 40 can also be decided by checking the value of the catalyst temperature in the state in which the conversion efficiency assumes a standard decision conversion efficiency $C_S$ specified as a criterion (refer to FIG. 11). In a case where the catalyst temperature estimated by the catalyst state estimation means 80 is higher than a standard limit temperature $T_{ST}$ in the state in which the value of the conversion efficiency is equal to the standard decision conversion efficiency $C_S$, the decision means 84 decides that the replacement of the catalyst 40 is required. Incidentally, the standard decision conversion efficiency $C_S$ serves equivalently to the standard decision temperature $T_S$ in the foregoing embodiment. Besides, the standard limit temperature $T_{ST}$ serves equivalently to the standard limit value $C_{ST}$ of the conversion efficiency in the foregoing embodiment.

In a case where the value $C_{YY}$ of the conversion efficiency calculated on the basis of the actual measurement data by the conversion efficiency calculation means 82 is unequal to the standard decision conversion efficiency $C_S$, a corresponding temperature $T_{YY}$ is corrected using the same technique as in the foregoing embodiment. Then, the decision means 84 renders the decision in such a way that a temperature $T_{YS}$ obtained by the correction of the temperature $T_{YY}$ is compared with the standard limit temperature $T_{ST}$. In the way, this aspect of performance of the present invention is an example corresponding to claim 10 of the appended claims. An expression "standard state previously set as to the index" in claim 10 corresponds to the standard decision conversion efficiency $C_S$ stated here. An expression "criterion value" in claim 10 corresponds to the standard limit temperature $T_{ST}$ stated here.

As thus far described, according to the embodiment, the temperature of the catalyst can be known without additionally providing a thermometer. Moreover, the deterioration state of the catalyst is decided after correcting the calculated value of the conversion efficiency in accordance with the temperature of the catalysts so that the state of the catalyst can be precisely diagnosed.

Incidentally, the technique of the temperature estimation by the catalyst state estimation means is extensively applicable, not only for estimating the temperature of the catalyst, but also for estimating the temperatures of the engine itself and various parts of the exhaust system of the engine. Besides, the accuracy of the temperature estimation is heightened when the quantity of intake air, the quantity of fuel injection, etc. are comprehensively included in the temperature estimation.

The present invention is not restricted to the above case of utilizing the conversion efficiency, but it is also applicable to the case of making a diagnosis by the use of any parameter or the like which reflects the deterioration state of the catalyst. Needless to say, however, the correcting method explained before needs to be modified or altered in correspondence with the parameter or the like.

In the foregoing embodiment, the temperature of the catalyst 40 is estimated on the basis of the operating situation of the engine 2 detected by the flow-rate sensor 17 or the like, and the judgement on the propriety of the execution of the decision, the correction of the conversion efficiency, etc. are made on the basis of the estimated temperature. In an actual equipment, however, the judgement on the propriety of the execution of the decision, the correction of the conversion efficiency, etc. may well be made in such a way that the operating situation of the engine 2 detected by any of the sensors is used directly without the intervention of the parameter "temperature" as in the embodiment (this aspect of performance corresponds to claims 7 and 8 of the appended claims). By way of example, the decision may well be suspended on condition that the average value of the quantity of intake air within a predetermined time period in the past is less than a certain value.

In the above, the functions of the catalyst state estimation means 80, conversion efficiency calculation means 82 and decision means 84 have been explained as being definitely separate. In actual fact, however, these means operate in close association, and the corresponding relations of the aspects of performance with the appended claims are not strict. Insofar as the functions are fulfilled of the entire diagnostic device 8, they may be allotted anyhow. By way of example, the function as the "suspension means" may well be owned by the decision means 84.

What is claimed is:

1. A catalyst-deterioration diagnostic apparatus for diagnosing a deterioration state of a catalyst used for eliminating noxious substances contained in engine exhaust gas comprising:
    an indexer configured to obtain a value of an index which is used for deciding the deterioration state of the catalyst;
    a catalyst state estimator operative to estimate a state of said catalyst at a time at which said indexer has obtained the index value, as to a physical quantity which affects a catalytic action of said catalyst;
    a correction element operative to correct said index value obtained by said indexer, to a value in a standard state of said catalyst previously set as to the physical quantity, by the use of the estimated result of said catalyst state estimator;
    a mechanism operative to suspend a determination of the deterioration state of the catalyst if the value of the standard state value is outside a stored predetermined range; and
    a decision element endowed with a preset criterion value to decide said deterioration state of said catalyst by comparing the index value corrected by said correction element, with the criterion value, wherein
    said catalyst state estimator includes
    an operating-situation detected operative to detect a value of that state variable of the engine which correlates with said physical quantity;
    a memory operative to store therein correspondence information which indicate correlations between values of the state variable and those of said physical quantity; and
    an arithmetic element operative to determine a value of said physical quantity by referring to the correspondence information on the basis of the detected result of said operating-situation detector.

2. A catalyst-deterioration diagnostic apparatus for diagnosing a deterioration state of a catalyst which serves to eliminate noxious substances contained in an engine exhaust gas, comprising:
    an indexer operative to obtain a value of an index which is used for deciding the deterioration state of the catalyst;
    a decision element endowed with a preset criterion value to decide said deterioration state of said catalyst by comparing the index value obtained by said indexer with the criterion value;
    a catalyst state estimator operative to estimate a state of said catalyst at a time at which said indexer has obtained said index value, as to a physical quantity which affects a catalytic action of said catalyst; and
    a suspension element endowed with a predetermined range concerning the physical quantity to cause said decision element to suspend the decision on condition that a value of said physical quantity obtained by said catalyst state estimator is outside the predetermined range, wherein
    said catalyst state estimator includes:
    operating-situation detector operative to detect a value of that state variable of the engine which correlates with said physical quantity;
    a memory operative to store therein correspondence information which indicate correlations between values of the state variable and those of said physical quantity; and
    an arithmetic mechanism operative to determine a value of said physical quantity by referring to the correspondence information on the basis of the detected result of said operating-situation detector; and
    a modifying element operative to modify the index value to a value in the standard state presently set, wherein the arithmetic mechanism compares the modified index value with a present value.

3. A diagnostic apparatus for diagnosing a deterioration state of a catalyst in an engine, comprising:
    a memory for storing a preset criterion value and a predetermined range for a state variable of the engine that correlates with a physical quantity affecting a catalytic action of the catalyst; and
    a processor operatively connected to the memory for obtaining an index value indicative of a conversion efficiency of the catalyst, receiving a value of the state variable of the engine, suspending a determination of the deterioration state of the catalyst if the value of the state variable is outside the predetermined range, and determining the deterioration state of the catalyst by comparing the index value with the preset criterion value if the value of the state variable is within the predetermined range.

4. The diagnostic apparatus of claim 3, wherein the physical quantity is a temperature of the catalyst and the state variable is selected from the group consisting of a quantity of intake air, a quantity of fuel injection, and a revolutions-per-minute of the engine.

5. The diagnostic apparatus of claim 3, wherein the preset criterion value represents a limit of deterioration calling for replacement of the catalyst.

6. A method of diagnosing a deterioration state of a catalyst in an engine, comprising:
  (a) storing a preset criterion value and a predetermined range for a state variable of the engine that correlates with a physical quantity affecting a catalytic action of the catalyst;
  (b) obtaining an index value indicative of a conversion efficiency of the catalyst;
  (c) detecting a value of the state variable of the engine;
  (d) suspending a determination of the deterioration state of the catalyst if the value of the state variable is outside the predetermined range; and
  (e) determining the deterioration state of the catalyst by comparing the index value with the preset criterion value if the value of the state variable is within the predetermined range.

7. The method of claim 6, wherein the physical quantity is a temperature of the catalyst and the state variable is selected from the group consisting of a quantity of intake air, a quantity of fuel injection, and a revolutions-per-minute of the engine.

8. The method of claim 6, wherein the present criterion value represents a limit of deterioration calling for replacement of the catalyst.

9. A method of diagnosing a deterioration state of a catalyst in an engine, comprising:
  (a) storing a preset criterion value;
  (b) obtaining an index value indicative of a conversion efficiency of the catalyst;
  (c) detecting a value of a state variable of the engine that correlates with a physical quantity affecting a catalytic action of the catalyst;
  (d) modifying the index value to a value in a standard state of the catalyst previously set as to the physical quantity using the value of the state variable;
  (e) determining the deterioration state of the catalyst by comparing the modified index value with the preset criterion value; and
  (f) suspending a determination of the deterioration state of the catalyst if the value of the state variable is outside the predetermined range.

10. The method of claim 9, wherein the physical quantity is a temperature of the catalyst and the state variable is selected from the group consisting of a quantity of intake air, a quantity of fuel injection, and a revolutions per minute of the engine.

11. The method of claim 9, wherein the present criterion value represents a limit of deterioration calling for replacement of the catalyst.

12. The method of claim 6, wherein steps (d) and (e) are carried out by using a processor which obtains the index value and the state variable from a memory which stores the present criterion value and the predetermined range for the state variable.

13. The method of claim 9, wherein steps (d) and (e) are carried out by using a processor which obtains the index value and the state variable from a memory which stores the present criterion value for the state variable.

* * * * *